United States Patent

[11] 3,609,361

[72] Inventor Phillip Shevick
 Evanston, Ill.
[21] Appl. No. 761,129
[22] Filed Sept. 20, 1968
[45] Patented Sept. 28, 1971
[73] Assignee Nuclear-Chicago Corporation
 Des Plaines, Ill.

[54] METHOD AND APPARATUS FOR EXTERNAL STANDARDIZATION OF LIQUID SCINTILLATION SAMPLES
 14 Claims, 4 Drawing Figs.
[52] U.S. Cl. .................................................. 250/71.5, 250/106
[51] Int. Cl. .................................................. G01t 1/20
[50] Field of Search .................................................. 250/71.5, 106 SC

[56] References Cited
 UNITED STATES PATENTS
3,320,419 5/1967 Thomas et al. ................ 250/106 SC
3,381,130 4/1968 Nather ...................... 250/106 SC
3,428,804 2/1969 Comunnetti ................ 250/71.5

Primary Examiner—Archie R. Borchelt
Attorneys—Lowell C. Bergstedt, Walter C. Ramm and Helmuth A. Wegner ABSTRACT: A radioactive source material of the type producing substantially coincident penetrating and nonpenetrating radiations is dispersed throughout a scintillating medium positioned external and adjacent to a liquid scintillation sample. A substantial number of the penetrating radiations produce scintillations in the sample and substantially all of the nonpenetrating radiations produce tag scintillations in the external medium. Separate detectors for sample and tag scintillations produce either coincident or anticoincident output pulses depending upon whether the detected event is a standardizing or a sample event, and logic circuitry is provided to count, simultaneously or in sequence, sample pulses and standardizing pulses.

PATENTED SEP 28 1971 3,609,361
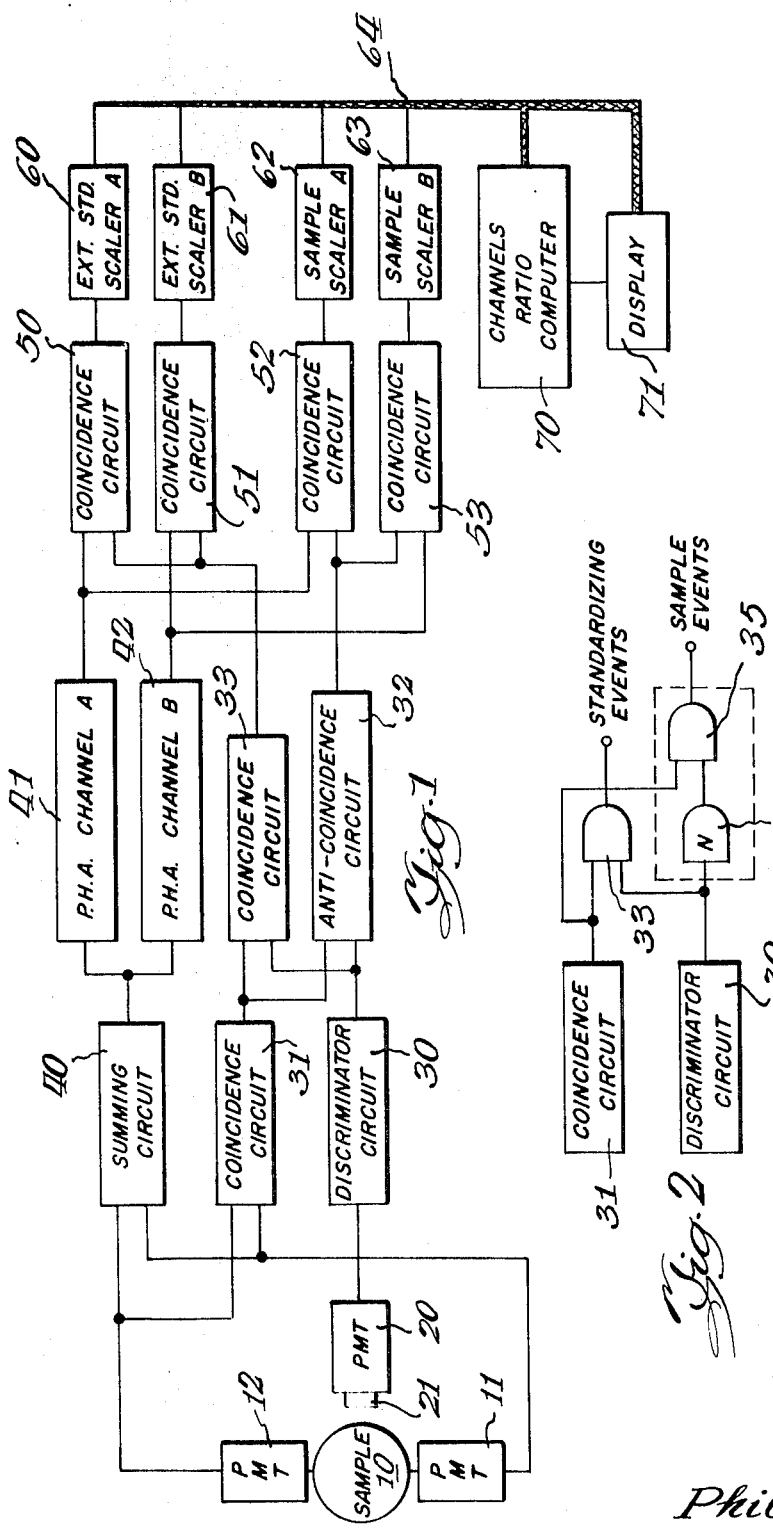
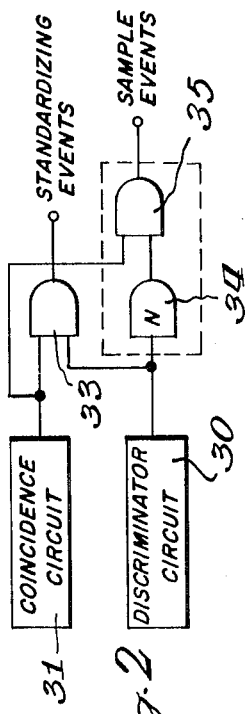
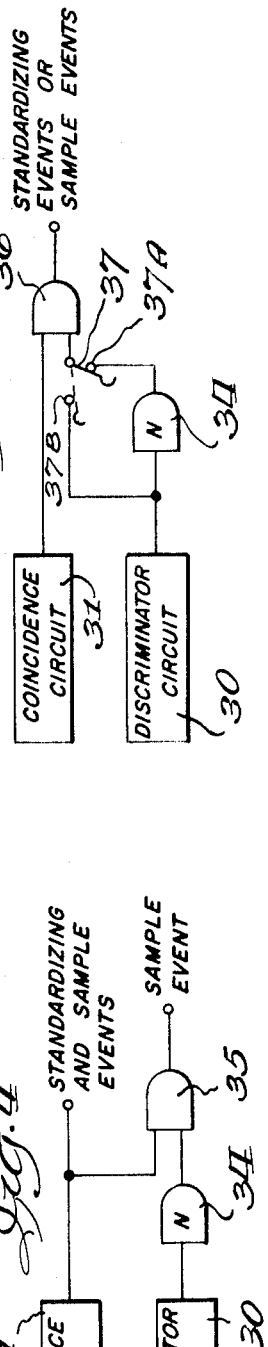
INVENTOR
Philip Shevick
BY Lowell C. Bergstedt
ATTORNEY

METHOD AND APPARATUS FOR EXTERNAL STANDARDIZATION OF LIQUID SCINTILLATION SAMPLES

External standardization of liquid scintillation samples has become a well-known procedure in the field of liquid scintillation spectrometry. The varying quench conditions existing in liquid scintillation samples which necessitate the use of some method of standardization are described in Packard U.S. Pat. No. 3,188,468. The term "standardization" may be used interchangeably with the term "quench correction," although the latter term more accurately describes the purpose involved in all liquid scintillation sample standardizations. The commercially available instruments which employ external standardization involve motion of a radioactive source from a remote position, shielded from the sample in the counting chamber, to a position adjacent the counting chamber, where the penetrating radiations from the source impinge upon the scintillating medium in the sample and produce a spectrum of standardizing scintillations therein. Source movement is an integral aspect of the external standardization approach described in the Packard patent mentioned above. In a copending patent application of Richard B. Frank, Ser. No. 541,644, filed Apr. 11, 1966 now U.S. Pat. 3,500,447, and in a copending application of Raymond L. Meeder and Joseph E. Kus, Ser. No. 541,767, filed Apr. 11, 1966 now U.S. Pat. No. 3,480,778, methods and apparatus for accomplishing external standard source movement and positioning are described.

As noted above, all of the present commercially available liquid scintillation counting instrumentation which include an external standardization feature involve movement of a radioactive source. The source must be remote from the sample while counting of the sample is taking place to prevent the production of unwanted background counts. The external standardization counting takes place after the source is moved to a location in the vicinity of the sample, and the counted scintillations during this period involve both standardizing events and sample events. To obtain the count of net standardizing events a subtraction of sample events from the total number of events counted during the standardizing period must be performed. This subtraction assumes that the sample count during the standardizing period is substantially the same as the sample count during the sample counting period. For long half-life isotopes in the sample this is substantially true, but for shorter half-life isotopes an inaccurate net standardizing count would be obtained. In other words, if the sample activity is lower during the standardizing counting interval than it was during the sample counting interval, the required subtraction will result in a net standardizing count which is lower than that actually produced by the external source during the standardizing interval.

In Packard U.S. Pat. No. 3,390,269 an ON-OFF X-ray tube is disclosed as the source of standardizing penetrating radiations. In that setup, the source movement is eliminated and sample counting is performed during a period when the X-ray source is OFF. However, this system also involves two separate counting periods; one for the sample alone and a second one for the sample plus standardizing events. Thus, the system suffers from the same possible inaccuracies in obtaining the standard counts and the requirement of two counting periods.

In accordance with this invention, a method and apparatus for counting and standardizing liquid scintillation samples during a single counting interval with the external source always exposed to a liquid scintillation sample to eliminate source movement and inaccuracies in obtaining net standardizing counts. However, in accordance with an alternate embodiment of the invention, two separate counting periods can be provided, during both of which the external standardizing source of radiations is exposed to the liquid scintillation sample.

Accordingly, it is the principal object of this invention to provide improved liquid scintillation counting apparatus.

Another object of this invention is to provide an improved method for counting and standardizing liquid scintillation samples.

A more particular object of this invention is to provide liquid scintillation counting apparatus for performing concurrent sample and standardizing counting during a single counting period.

Another object of this invention is to provide liquid scintillation counting apparatus in which the source of external standardizing radiation is continuously exposed to the liquid scintillation sample being counted.

In a preferred embodiment of this invention, the external standardizing source is a radioactive isotope at least partially dispersed throughout a scintillating medium, the radioactive source being of the type producing, upon each decay event, at least one nonpenetrating radiation paired with at least one penetrating radiation in substantial coincidence. In this preferred embodiment, the body of scintillating material with the dispersed source therein is positioned adjacent the sample at all times that counting of scintillations in the sample is occurring. Consequently, for each penetrating radiation emitted by the standardizing source and penetrating into the sample to produce a scintillation therein, a corresponding scintillation will in almost every instance be produced in the encapsulating scintillating medium by the nonpenetrating radiation which accompanies the penetrating radiation. The scintillation produced by the nonpenetrating radiation is detected by a photomultiplier tube-discriminator combination to produce an output pulse which will coincide with an output pulse in the photomultiplier tubes which detect the scintillation in the sample. Thus, a tag pulse at the output of the discriminator indicates that the scintillation detected in the sample is a standardizing event rather than a sample event. The absence of a tag pulse at the output of the discriminator would indicate that scintillation event detected in the sample is in almost every instance a sample event rather than a standardizing event. Various combinations of coincidence and anticoincidence circuitry may be provided to distinguish, on the basis of the tag pulses, which of the scintillations occurring in the sample and producing output pulses from the photomultipliers looking at the sample are sample events and which of them are standardizing events.

The advantages inherent in the apparatus of this invention are quite readily apparent. Because the sample is continuously exposed to standardizing radiations, and standardizing events and sample events are counted during the same time interval, the overall length of a counting period for a particular sample is reduced. This is particularly important in an automatic liquid scintillation counting system in which a large number of samples are to be counted on a serial basis. In effect, the sample counting capacity of the apparatus is thereby increased. Also, because the source is continuously producing standardizing events during the single counting interval, it is likely that a source of lower activity can be used to achieve the same overall counting statistics. Finally, the elimination of source movement or switching circuits is a distinct advantage since the mechanisms and control apparatus for accomplishing such movement or switching add to the cost and complexity of the instrument.

Other objects, features and advantages of this invention will become apparent from a consideration of the following detailed description in conjunction with the accompanying drawings in which:

FIG. 1 is a schematic diagram of a preferred embodiment of this invention;

FIG. 2 is a schematic diagram of a portion of the system shown in FIG. 1 to illustrate that portion in more detail;

FIG. 3 is a schematic diagram of an alternate embodiment of this invention;

FIG. 4 is a schematic diagram of another alternate embodiment of this invention.

Referring now to FIG. 1, a liquid scintillation sample 10 is shown with photomultiplier tubes 11 and 12 on either side thereof for detecting scintillations occurring in sample 10. As is well known, sample 10 typically comprises a light transmissive vial having a liquid scintillator and at least one radioactive isotope therein. In an actual physical embodiment, sample 10 is brought into a counting chamber which is shielded from light and from background radiation, and photomultiplier tubes 11 and 12 are mounted permanently on opposite sides of the counting chamber. A typical automatic liquid scintillation counting system would include a multisample conveyor such as that disclosed in Meeder et al. U.S. Pat. 3,163,756, and an automatic sample changer such as that disclosed in Rowan et al. U.S. Pat. No. 3,283,151. Photomultipliers 11 and 12 are powered by a voltage supply (not shown) and transduce a scintillation occurring in sample 10 into a pair of voltage pulses. The voltage pulse at the output of each photomultiplier has an amplitude proportional to the energy of the scintillation occurring in the sample.

As shown, a third photomultiplier tube 20 is mounted in a position adjacent sample 10 and has mounted on its light-sensitive surface a thin scintillation crystal 21 having a radioactive isotope at least partly dispersed therein. The radioactive isotope is of a type which produces at least one nonpenetrating radiation and at least one penetrating radiation in substantial coincidence upon each decay event. Each of the nonpenetrating radiations produces a corresponding scintillation in crystal 21 which is detected by photomultiplier tube 20. In an actual embodiment a small percentage of the decay events occurring within crystal 21 may not be detected by a corresponding scintillation being produced by the nonpenetrating radiation, but with the proper source-crystal combination a very high percentage of such decay events will be detected and the small number not detected will introduce negligible error. Penetrating radiations produced as a result of decay events of the isotope in crystal 21 may emanate in any direction, but on an average time basis, a substantial percentage of such penetrating radiations will escape crystal 21 in a proper direction and penetrate into sample 10 to produce a scintillation spectrum therein. For each scintillation produced in sample 10 by a penetrating radiation from a radioisotope in crystal 21, a corresponding tag pulse will occur at the output of photomultiplier 20. Tag pulses not coincident with scintillations in sample 10 will also appear at the output of photomultiplier 20 but these will be extraneous and will not be involved in the operation of the circuitry.

Discriminator circuit 30 may be either an integral or differential discriminator circuit functioning to select output pulses from photomultiplier 20 which correspond to tag scintillations in crystal 21. Tag pulses resulting from tag scintillations in crystal 21 will lie in a particular amplitude range whereas spurious noise and background pulses at the output of photomultiplier 20 will usually be of lower amplitude. Thus discriminator circuit 30 may be set to produce an output pulse only when selected tag pulses are received from photomultiplier 20.

Output pulses from photomultipliers 11 and 12 are received by a coincidence circuit 31 and a summing circuit 40. Coincidence circuit 31 produces an output pulse only when pulses are received coincidentally from photomultipliers 11 and 12. A scintillation occurring in sample 10 will produce coincident output pulses from photomultipliers 11 and 12 and thus an output pulse from coincidence circuit 31. A noise pulse occurring in one or the other of the photomultiplier tubes is likely to be anticoincident, that is, only one such pulse would appear at a particular moment so no pulse output would be produced by coincidence circuit 31. Thus, the function of coincidence circuit 31 is to reject various noise pulses at the outputs of photomultipliers 11 and 12 and to signal substantially only the pulses resulting from scintillations occurring in sample 10. It should be understood, however, that a less accurate scintillation counting system could be provided by using only one photomultiplier tube to detect scintillations in sample 10.

Summing circuit 40 provides an output pulse having an amplitude which is the sum of the amplitudes of pulses at its input. Thus, summing circuit 40 will produce a single output pulse which has an amplitude equal to the sum of the coincident input pulse which appear when a scintillation occurs in sample 10. Spurious output pulses may be present at the output of summing circuit 40, but these are of little or no consequence to the overall operation of this system since they are eliminated later.

Coincidence circuit 33 receives the outputs of discriminator circuit 30 and coincidence circuit 31 and produces an output pulse only upon coincidence of pulses at its inputs. In other words, coincidence circuit 33 produces an output pulse each time a standardizing scintillation event occurs in sample 10. This can be seen from the fact that coincidence circuit 31 produces an output pulse for each scintillation occurring in sample 10 and a tag pulse appears at the output of discriminator circuit 30 if the scintillation is a standardizing event resulting from penetrating radiation emitted by the external standard source. Coincidence of the tag pulse and the scintillation pulse produces an output pulse from coincidence circuit 33 to indicate the occurrence of a standardizing event.

Correspondingly, an output pulse from coincidence circuit 31 which occurs in anticoincidence with a tag pulse from discriminator circuit 30 will result in an output pulse from anticoincidence circuit 32. In other words, anticoincidence circuit 32 produces an output pulse only when a scintillation has occurred in sample 10 which was not produced by radiation emanating from the standardizing source in crystal 21. Thus, an output pulse from anticoincidence circuit 32 indicates the occurrence of a sample event within liquid scintillation sample 10. It should be appreciated that this sample event may in fact be an event resulting not from the radioisotope within the sample vial but from background radiation or from the small number of radiations from the source in crystal 21 which are not accompanied by detected tag scintillations. In any event, the output pulse from anticoincidence circuit 32 will be considered a sample pulse indicative of a sample scintillation rather than a standardizing scintillation and such few errors that occur will be ignored or else compensated for on a predetermined statistical basis.

From the description given so far, it is already apparent that the circuitry shown in FIG. 1 provides for the concurrent counting of sample and standardizing events occurring in liquid scintillation sample 10. In an operational sense it is usually not desirable to count all of the standardizing or sample events, but rather to count only those that correspond to scintillations occurring in sample 10 that are within a particular energy range or ranges. However, in an elementary sense and under certain circumstances, it might be that all of the standardizing and sample events signified by output pulses from anticoincidence circuit 32 and coincidence circuit 33, respectively, would be counted. As shown in FIG. 1, however, two channels of pulse height analysis have been provided to select two energy ranges of scintillations in sample 10 for counting. It will be understood, of course, that only one, or more than one, channels of pulse height analyses could be provided in a similar fashion to that shown.

As stated, the output of summing circuit 40 is a pulse having an amplitude representing the sum of the amplitudes of coincident input pulses. For the coincident input pulses resulting from a scintillation in sample 10 the corresponding output pulse from summing circuit 40 will have an amplitude which is also proportional to the energy of the scintillation occurring in the sample. Involved in summing circuit 40 may be gain amplification of the input impulses, but in any event, any output pulse from the summing circuit 40 which corresponds to a scintillation in sample 10 will be proportional in amplitude to the energy of the associated scintillation. P.H.A. (pulse height analysis) channel A(41) and P.H.A. channel B (42) receive the output pulses from summing circuit 40. Each channel 41 and 42 is typically set up to select pulses having a particular range of amplitudes and typically the ranges in a two channel operation will not overlap but will be separated from or adjacent to each other. It is well known that sample 10 may contain two radioactive isotopes emitting radiations of different energies, in which case, the two pulse height analysis channels 41 and 42 may be set up to discriminate, on a pulse height basis, the scintillations produced by the two different isotopes in the sample. On the other hand, a single isotope may be present in the sample and it may be desirable to count the scintillations in two ranges of the spectrum produced by the single isotope. The radiation from the external source in crystal 21 also produce a spectrum of scintillations in sample 10 which may be counted in one or more channels. The typical approach to counting external standardization at the present time is the "channels ratio" method as described in detail in Nather U.S. Pat. No. 3,381,130. Basically, the channels ratio method of external standardization counting involves counting sample scintillations and standardizing scintillations in at least two channels and taking the ratio of net standardizing events detected in one channel to the net standardizing events detected in the other channel to produce a number which can be correlated with a predetermined quench correction curve for the particular sample being counted. All of this is well known to those skilled in the liquid scintillation counting art and will not be described in detail here.

The output of P.H.A. channel A is a pulse only when the output pulse from summing circuit lies within the amplitude range for which channel A is set up. Correspondingly, an output pulse from channel B will occur only when the output pulse from summing circuit 40 lies within its designated amplitude range. The output from channel A is fed to a coincidence circuit 50 and a coincidence circuit 42, whereas the output from channel B is fed to a coincidence circuit 51 and a coincidence circuit 53. Coincidence circuit 33 feeds both coincidence circuits 50 and 51, whereas anticoincidence circuit 32 feeds both coincidence circuits 52 and 53. An output from coincidence circuit 50 will occur only when coincident output pulses are received from coincidence circuit 33 and P.H.A. channel A. Coincidence of such pulses will occur only when a standardizing scintillation occurs in sample 10 and has an energy within the range selected by channel A. Consequently, output pulses from coincidence circuit 50 occur for each standardizing event within a preselected energy range. Correspondingly, output pulses from coincidence circuit 51 will be seen to occur only for standardizing events in sample 10 within an energy range selected by channel B. External standard scalers 60 and 61 receive the outputs, respectively, from coincidence circuits 50 and 51 to register the number of standardizing events occurring within the selected channels on an accumulating basis during the counting period.

Coincidence circuit 52 will produce an output pulse only upon coincidence of output pulses from channel A and anticoincidence circuit 32. Thus, it will be seen that an output pulse from coincidence circuit 52 indicates the occurrence of a sample event within the energy range determined by the setting of pulse height analysis channel A. Similarly, the output from coincidence circuit 53 indicates occurrence of a sample event within the energy range determined by the setting of channel B. Scalers 62 and 63 respectively count the sample events occurring in channel A and channel B.

As shown, a cable 64 connects scalers 60, 61, 62 and 63 to channels ratio computer 70 and to a display 71. Channels ratio computer 70 is also coupled to display 71. Display 71 may be selectively programmed to printout or otherwise display the accumulated counts in any or all of the scalers or a particular ratio value computed by computer 70. Channels ratio computer 70 may be programmed to compute external standard channels ratio in a (channel B/channel A) manner or vice versa. It may also be programmed to compute the ratio of counts accumulated in the sample scalers. The desirability of channels ratio computing of external standardizing counts is well explained in the above-referenced Nather patent, and involves particularly the providing of a quench correction measurement independent of sample volume and the particular strength of the external standard source. If channels ratio counting is not provided, it is understood that the strength of the external standard source must be known in order for appropriate quench correction to be provided.

Source-crystal combination 21 may involve the use of an isotope such as Americium-241 which involves an alpha decay in substantial coincidence with a gamma emission. The alpha particle is a nonpenetrating radiation which will produce a scintillation in the scintillation crystal and a corresponding tag pulse at the output of discriminator circuit 30. A number of gamma rays from the Americium decay will produce scintillations in sample 10 because of their penetrating energy. Other radioisotopes which decay by beta-gamma or positron annihilation processes may also be used with appropriate modifications. Those familiar with the art of radiation detection will readily see how the apparatus disclosed in FIG. 1 would be incorporated in a physical embodiment of a liquid scintillation counting system, and how the incorporation of various types of appropriate radioactive isotope sources and detectors would be accomplished. It should be apparent from the above description of FIG. 1 that a great advantage is obtained by providing for concurrent sample and standardizing counting in a liquid scintillation counting system. Again, those familiar with the art of scintillation counting will appreciate all of the ramifications and advantages attendant upon concurrent counting and elimination of mechanical source movement in this simple fashion.

In FIG. 2 coincidence circuit 33 is shown as an AND-GATE receiving outputs from coincidence circuit 31 and discriminator circuit 30. AND-GATE 33 thus produces an output indicating a standardizing event upon coincidence of pulses from coincidence circuit 31 and discriminator circuit 30. Anticoincidence circuit 32 is shown as comprising NOT-GATE 34 receiving the output from discriminator circuit 30 and an AND-GATE 35 receiving the outputs from coincidence circuit 31 and NOT-GATE 34. NOT-GATE 34 produces an output pulse only when no input pulse is present. Thus, an output pulse from AND-GATE 35 appears only when a pulse from coincidence circuit 31 is anticoincident with a pulse from discriminator circuit 30 and indicates the occurrence of a sample event. The binary logic and various details of circuitry involved in NOT and AND-GATES is well understood by those familiar with binary logic circuitry and thus will not be described here.

In FIG. 3 an alternate embodiment of this invention is shown involving a switchable combination of circuitry at the outputs of discriminator circuit 30 and coincidence circuit 31. AND-GATE 36 receives the output from coincidence circuit 31 and, on a selected basis, the output from either discriminator circuit 30 or NOT-GATE 34. Thus, when switch 37 is bridged to contact 37A to place the output from NOT-GATE 34 on the input to AND-GATE 36, the corresponding output from AND-GATE 36 will be a pulse only when a pulse from anticoincidence circuit 31 is anticoincident with a pulse from discriminator circuit 30. Such output pulses indicate the occurrence of sample events. Alternatively, when switch 37 is bridged to contact 37B the output from AND-GATE 36 will be a pulse only when coincident pulses occur on the outputs of coincidence circuit 31 and discriminator circuit 30. Such output pulses indicate the occurrence of standardizing events. The apparatus shown in FIG. 3 permits the sequential counting of sample and standardizing events in much the same manner as is accomplished in present day commercial apparatus except that standardizing events are separately counted and are not intermingled with sample events during the standardizing counting period. Accordingly, no subtraction of sample events from standardizing events need take place. The incorporation of the circuitry of FIG. 3 into a single or multichannel pulse height analysis system such as in FIG. 1 is considered to be obvious to one skilled in the art.

In FIG. 4 another alternate embodiment of this invention is shown. In this embodiment the output from coincidence circuit 31 is used to indicate the combined standardizing and sample events occurring. NOT-GATE 34 and AND-GATE 35 combine in a fashion similar to that shown in FIG. 2 to give the indication at the output of AND-GATE 35 of only sample events occurring. In this embodiment, subtraction of the counted sample events from the combined standardizing and sample events would be necessary to develop the quench correction information from the net standardizing counts. However, it will be appreciated that only one counting period is involved in this embodiment so it partakes of the advantages of the embodiment disclosed in FIG. 1. Again, the way in which this embodiment is incorporated into a single or multichannel pulse height analysis scheme is considered to be obvious to one familiar with this art. It should be readily understood that the elimination of NOT-GATE 34 from the circuitry shown in FIG. 4 would result in the indicating of standardizing events only at the output of AND-GATE 35 and corresponding subtraction of standardizing events from overall events could be provided.

The above description of a preferred and several alternate embodiments of this invention is merely exemplary and many modifications could be made therein by those skilled in the art without departing from the scope of this invention as claimed in the following claims:

1. In a liquid scintillation counting system for analyzing an unknown sample comprised of a light transmissive vial having a liquid scintillator and at least one radioactive isotope therein, in combination:
   standardizing means positioned external to said sample operative to produce standardizing scintillations in said sample and a first output signal accompanying substantially all of said standardizing scintillations;
   detecting means for producing a second output signal in response to scintillations in said sample;
   whereby said second output signal may be characterized as a standardizing event when coincident with said first output signal and said second output signal may be characterized as a sample event when anticoincident with said first output signal.

2. The combination as claimed in claim 1, further including switchable circuit means for producing in one switching state a third output signal upon each appearance of said second output signal coincident with an appearance of said first output signal to indicate the occurrence of a standardizing scintillation and in another switch state a fourth output signal upon each appearance of said second output signal anticoincident with an appearance of said first output signal to indicate the occurrence of a sample scintillation.

3. The combination as claimed in claim 1, further including circuit means for producing a third output signal upon each appearance of said second output signal coincident with an appearance of said first output signal to indicate the occurrence of a standardizing scintillation.

4. The combination as claimed in claim 1, further including circuit means for producing a third output signal upon each appearance of said second output signal anticoincident with an appearance of said first output signal to indicate the occurrence of a sample scintillation.

5. The combination as claimed in claim 1, further including
   first circuit means for producing a third output signal upon each appearance of said second output signal coincident with an appearance of said first output signal to indicate the occurrence of a standardizing scintillation; and
   second circuit means for producing a fourth output signal upon each appearance of said second output signal anticoincident with an appearance of said first output signal to indicate the occurrence of a sample scintillation.

6. The combination as claimed in claim 5, wherein said standardizing means includes
   radioactive source means positioned adjacent said sample and producing a plurality of decay events each involving emission of at least a pair of substantially coincident radiations, a substantial percentage of one of said radiations in each said pair producing scintillations in said sample; and
   means for detecting substantially all of the other of said radiations in each said pair and producing said first output signal in response thereto.

7. The combination as claimed in claim 5, wherein said standardizing means includes:
   scintillating means positioned external and adjacent to said sample;
   radioactive source means for producing a plurality of decay events each involving emission of at least a pair of substantially coincident radiations, one of said radiations being of a nonpenetrating type and the other being of a penetrating type, said source means being supported within said scintillating means such that substantially all of said nonpenetrating radiations produce scintillations in said scintillating means and a substantial number of said penetrating radiations produce scintillations in said sample; and
   means for detecting each of said scintillations in said scintillating means and producing said first output signal in response thereto.

8. The combination as claimed in claim 5, wherein said standardizing means comprises
   a body of scintillator material positioned adjacent said sample;
   a radioactive isotope at least partly dispersed within said body of scintillator material, said isotope being of a type which emits upon each decay event a nonpenetrating radiation and at least one penetrating radiation in substantial coincidence, substantially all of said nonpenetrating radiations producing corresponding tag scintillations in said scintillator material and a substantial percentage of said penetrating radiations producing corresponding standardizing scintillations in said sample;
   a scintillation detector optically coupled to said body of scintillator material to produce output pulses including tag pulses having amplitudes proportional to the energies of associated tag scintillations; and
   a discriminator circuit coupled to said detector to produce said first output signal only in response to said tag pulses, said first output signal being a pulse of substantially constant amplitude.

9. The combination as claimed in claim 8, wherein said detecting means includes
   at least one scintillation detector optically coupled to said sample to produce output pulses including scintillation pulses having amplitudes proportional to the energies of associated scintillations in said sample; and
   third circuit means coupled to said detector to produce said second output signal only in response to said scintillation pulses, said second output signal being a pulse of substantially constant magnitude;
   and wherein said first circuit means comprises
   a first AND-GATE coupled to said discriminator circuit and said third circuit means to produce an output standardizing pulse only upon coincidence of a first and second output signal, and wherein said second circuit means comprises
   a NOT-GATE coupled to said discriminator circuit to produce a complement first output signal representing the logical complement of said first output signal; and
   a second AND-GATE coupled to said NOT-GATE and said third circuit means to produce an output sample pulse only upon coincidence of a complement first and a second output signal.

10. The combination as claimed in claim 9, further comprising
    first and second register means coupled, respectively, to said first and second AND-GATES, each including at least one pulse scaler for counting at least a portion of said standardizing pulses and said sample pulses, respectively, during a single counting period.

11. The combination as claimed in claim 8 wherein said detecting means comprises
    a pair of scintillation detectors optically coupled to said sample, each of said detectors producing output pulses including parasitic pulses and scintillation pulses, said scintillation pulses having amplitudes proportional to the energies of associated scintillations in said sample and being produced in coincident pairs as distinguished from typically anticoincident parasitic pulses;

a first coincident circuit coupled to said pair of scintillation detectors to produce said second output signal only upon coincidence of output pulses from said detectors, said second output signal being a pulse indicating occurrence of a scintillation in said sample;

and wherein said first circuit means comprises a second coincidence circuit coupled to said discriminator circuit and said first coincidence circuit to produce an output standardizing pulse only upon coincidence of a first and a second output signal;

and wherein said second circuit means comprises a complement circuit coupled to said discriminator circuit to product a complement first output signal representing the logical complement of said first output signal; and a third coincidence circuit coupled to said complement circuit and said first coincidence circuit to produce an output sample pulse only upon coincidence of a complement first and a second output signal;

and further comprising a summing circuit coupled to said pair of scintillation detectors to produce summed output pulses having amplitudes representing the sum of the amplitudes of output pulses from said detectors;

at least a first pulse analysis circuit coupled to said summing circuit to produce selected output pulses only upon receipt of summed output pulses within a first preselected range of amplitudes;

a fourth coincidence circuit coupled to said second coincidence circuit and said first pulse analysis circuit to produce a selected standardizing pulse only upon coincidence of an output standardizing pulse and a selected output pulse;

a fifth coincidence circuit coupled to said third coincidence circuit and said first pulse analysis circuit to produce a selected sample pulse only upon coincidence of an output sample pulse and a selected output pulse; and first and second pulse scalers coupled, respectively, to said fourth and fifth coincidence circuits to count said selected standardizing pulses and said selected sample pulses, respectively, during a single counting period.

12. The combination as claimed in claim 11, wherein said second and fourth coincidence circuits are combined into a single coincident circuit and said third and fifth coincidence circuits are combined into a single coincidence circuit.

13. In a method for counting and standardizing a liquid scintillation sample during a single counting period, the steps comprising exposing the sample during said counting period to an external radioactive source of a type producing for each decay event at least a pair of substantially coincident radiations, a substantial percentage of one of said radiations in said pair producing a characteristic spectrum of scintillations in said sample;

detecting substantially all of the other of said radiations in said pair external to said sample;

detecting scintillations produced in said sample in at least one energy range;

counting detected scintillations occurring in coincidence with externally detected radiations as standardizing events; and counting detected scintillations occurring in anticoincidence with externally detected radiations as sample events.

14. In a method for counting and standardizing a liquid scintillation sample during two separate counting periods, the steps comprising exposing the sample during both counting periods to an external radioactive source of a type producing for each decay event at least a pair of substantially coincident radiations, a substantial percentage of one of said radiations in said pair producing a characteristic spectrum of scintillations in said sample;

detecting substantially all of the other of said radiations in said pair external to said sample;

detecting scintillations produced in said sample in at least one energy range;

counting as standardizing events during one of said counting periods detected scintillations occurring in coincidence with externally detected radiations; and counting as sample events during the other of said counting periods detected scintillations occurring in anticoincidence with externally detected radiations.